United States Patent [19]

Slama et al.

[11] 4,059,650
[45] Nov. 22, 1977

[54] ANTI-DRIP ADDITIVE SYSTEM FOR FIRE RETARDANT POLYPROPYLENE

[75] Inventors: Francis J. Slama, Aurora; Ivor R. Fielding, Naperville, both of Ill.

[73] Assignee: Standard Oil Company (Indiana), Chicago, Ill.

[21] Appl. No.: 652,879

[22] Filed: Jan. 27, 1976

[51] Int. Cl.$^2$ .................. C08L 51/00; C08L 63/00
[52] U.S. Cl. .................. 260/837 R; 260/45.7 R; 260/836; 260/854; 260/876 R
[58] Field of Search .................. 260/836, 876 R, 837

[56] References Cited

U.S. PATENT DOCUMENTS

| 3,375,300 | 3/1968 | Ropp | 260/837 |
|---|---|---|---|
| 3,506,603 | 4/1970 | Baker | 260/836 |
| 3,637,904 | 1/1972 | Barie | 260/836 |
| 3,760,031 | 9/1973 | Sato | 260/836 |
| 3,849,516 | 11/1974 | Plank | 260/836 |
| 3,867,477 | 2/1975 | Abu-Isa | 260/837 R |
| 3,868,433 | 2/1975 | Bartz | 260/836 |
| 3,886,227 | 5/1975 | VanBrederode | 260/836 |
| 3,966,845 | 6/1976 | Van Brederode | 260/876 R |
| 3,987,122 | 10/1976 | Bartz | 260/836 |

Primary Examiner—Paul Lieberman
Attorney, Agent, or Firm—William H. Magidson; Arthur G. Gilkes; William T. McClain

[57] ABSTRACT

Non-dripping, preferably fire retardant polypropylene compositions comprising modified polypropylene component and a cross-linker. Conventional fire retardants can also be present.

9 Claims, No Drawings

ANTI-DRIP ADDITIVE SYSTEM FOR FIRE RETARDANT POLYPROPYLENE

This application relates to non-dripping polypropylene compositions. More particularly, this invention relates to non-dripping, fire retardant polypropylene compositions comprising a polypropylene component chemically modified by reaction with an unsaturated carboxylic acid, a polyfunctional cross-linking agent, and preferably a fire retardant.

Polyolefin compositions are used extensively in fabricated products. Polypropylene compositions have gained increasing popularity as thermoplastic molding materials due to a combination of desirable characteristics such as high abrasion and chemical resistance, relatively high softening point, and low cost. Along with the development of the plastics industry and corresponding increase in the variety and sophistication of the products produced, it is necessary to reduce the flammability of these products. At the present time, lack of adequate fire retardancy is one of the principal barriers to opening of additional large markets for these materials. In addition, the increased cost resulting from the incorporation of most fire retardants into these polymers has been an additional barrier to commercial acceptance.

While it is relatively easy to make polypropylene compositions self-extinguishing according to UL-94V 2 tests and/or ASTM D-635 tests, very high additive loadings are required to make polypropylene compositions meet the non-dripping requirements of UL-94V 1 Specifications. Since a flaming drip can quickly spread a fire, it is important that polypropylene meet UL-94V 1 Specifications in many end uses.

ASTM TEST D-635 is used to establish relative burning characteristics of plastic materials but does not take drip into account. Underwriters Laboratories' Test UL-94 goes further to distinguish between samples which ignite a wad of cotton placed beneath the burning end of a test specimen and those in which drip is non-existent or insufficient to ignite the cotton. In our work, the UL-94 test procedure was followed except that the tests were conducted in a vented hood.

Stated simply, a polymer which meets UL-94V 2 specifications is one which is self-extinguishing within a 30-second time period. This test permits the polymer to drip and the drips can set a cotton wad below the test sample on fire. A polymer which meets UL-94V 1 specifications is also self-extinguishing within the 30-second time period and any drip must be insufficient to ignite the cotton. To meet UL-94V 0 test specifications, the polymer must be self-extinguishing within a ten second time period and must not drip.

There is also a need for non-dripping polypropylene compositions which satisfy UL-94V 1 specifications in electrical components generally and specifically in heavy electrical applications where polypropylene compositions come into contact with electrical current carrying components. For example, polypropylene compositions which satisfy UL-94V 1 tests can be used in "T.V. Yokes", which hold electrical components together. However, polypropylene compositions which only satisfy UL-94V 2 tests are not suitable for this application. Likewise, there is need for polypropylene compositions which meet UL-94V 1 tests in electrical appliance housings.

At the present time polypropylene compositions containing 3% $Sb_2O_3$ and 4% halogenated compounds meet UL-94V 2 specifications. However, to meet UL-94V 1 specifications, the level of the aforesaid additives must be increased to around 40%.

High loading of conventional fire retardants to prevent drip is undesirable due to the cost of the additives and/or the differences in physical properties of the base polymers containing varying levels of additives. Antimony trioxide is one of the chief ingredients of conventional fire retardant systems and presently costs around $1.68 per pound. Since polypropylene costs $0.25 to $0.30 per pound, it is economically desirable to provide polypropylene resins which meet UL-94V 1 specifications using low levels of antimony trioxide.

The resulting alteration in properties of the base polymer due to high loadings of fire retardants is also undesirable. For example, high fire retardant loadings produce an opaque resin which lacks the aesthetic appeal many consumers demand. In addition, loading a resin with additives generally increases water absorption and makes fabrication, particularly extrusion and/or injection molding, more difficult. The inherent hardness of the base polymer is particularly prone to deterioration in the presence of high concentrations of these additives. In applications where strength is required, such as in polypropylene "living hinges", the altered properties of the resin are undesirable. Also, resins containing high levels of halogenated compounds are less stable making them subject to greater UV attack. Compositions containing high levels of chloroparaffins often have an aesthetically undesirable tacky surface which can lead to contamination.

The general object of this invention is to provide a non-dripping polypropylene composition. A more specific object is to provide a non-dripping fire retardant polypropylene composition without increasing significantly the levels of conventional fire retardants present in the composition. Other objects appear hereinafter.

We have now found that the objects of this invention can be attained with polypropylene compositions comprising a polypropylene component modified by reaction with an alpha, beta-ethylenically unsaturated carboxylic acid and a polyfunctional cross-linker. Various fire retardants can be added to impart fire retardant properties to the composition. The modified polypropylene and other additives can be used in relatively low concentrations, as explained below, while unmodified polymer constitutes the principal resinous component. Due to the relatively low level of fire retardants and cross-linking agents and the chemical and physical similarities of the two types of propylene polymers, the desired non-dripping properties can be attained without loss of the desired properties of the polypropylene composition.

For the purposes of this invention, "resinous polymer of propylene" includes substantially crystalline homopolymeric polypropylene as well as block, random, or multi-segment copolymers of propylene containing at least 75% by weight propylene and up to 25% by weight of another alphaolefin, such as ethylene, butene-1, etc.

The modified polypropylene component comprises one of the aforesaid resinous polymers of propylene which has been chemically modified by reaction with an ethylenically unsaturated carboxylic acid, wherein the ethylenic unsaturation is on the carbon atoms which are alpha, beta to the carboxyl group. Examples of such acids include methacrylic acid, acrylic acid, crotonic acid, isocrotonic acid, maleic acid, maleic anhydride, fumaric acid, itaconic acid, etc. Methacrylic acid is preferred due to the relative ease with which it grafts to the crystalline propylene polymer.

For convenience, the modified polypropylene component can be thought of as comprising a backbone polymer and pendant acid moieties provided by alpha, beta-ethylenically unsaturated carboxylic acid. The pendant acid moieties in the modified polymer can comprise from 0.5 to 25%, preferably 5 to 15%, by weight of the polymer. In general, the higher the concentration of acid, the more expensive the modified polypropylene component and the greater the difference in physical properties between the modified polypropylene component and the base polymer. At the same time, the higher the concentration of acid the greater the functionality of the polymer and less total modified polypropylene necessary to obtain the same degree of cross-linking.

While modified resinous polymer of propylene can comprise up to 100% by weight of the polypropylene components, it is preferable to use 0.5 to 3 parts by weight unmodified polypropylene for each part by weight modified polypropylene. Although the modified polypropylene component is the essential ingredient, a mixture of unmodified polypropylene and modified polypropylene results in a blend which is more economical.

The modified polyproplyene can be prepared by treating one of the aforesaid unmodified resinous polymers of propylene containing at least 75% by weight propylene units to produce active sites on the polymer chain at which the modifying compound can anchor through its double bond. Such active sites can be readily introduced in known ways, as for example, by subjecting the polymer to the action of high energy ionizing radiations such as gamma rays, X-rays, or high speed electrons, or by contacting the polymer, either as a solid or dissolved in a solvent, with a free radical producing material such as a peroxide. Preferably, the modified polypropylene is prepared by reacting the unsaturated carboxylic acid with a solution of the polymer in an organic solvent containing a free radical producing material, such as the method described in Belgian Patent No. 607,269 which is incorporated herein by reference. U.S. Pat. Nos. 3,177,269 and 3,270,090 also discuss preparation of polymer grafts of the type used in the present invention and are hereby incorporated by reference.

In order to produce the desired non-dripping polypropylene compositions, the unmodified polypropylene component should be present in a weight ratio of 0.5 to 3 parts by weight per part by weight modified polypropylene component, preferably in a weight ratio of about 1 to 2 parts by weight per part by weight modified polypropylene polymer. Other things being equal, the higher the concentration of modified polypropylene in the composition the greater the cross-linking that will occur. However, it is economically desirable to keep the level of modified polypropylene in the composition as low as possible. Also, the lower the level of modified polypropylene, the smaller the effect on the physical and chemical properties of the composition. Surprisingly, tests indicate that lower levels of fire retardants are required to obtain the same level of fire retardancy where mixtures of the modified polymer and unmodified polypropylene are employed rather than when all or substantially all modified polymer is used.

The polyfunctional cross-linkers useful in this invention must be sufficiently reactive with the carboxyl groups of the modified polypropylene that they cross-link the polypropylene compositions to a non-dripping mass in a fire, but be sufficiently inert that they do not interfere with fabrication, particularly extrusion and/or injection molding. Suitable cross-linkers include aliphatic polyamines containing at least two primary amino groups, such as hexamethylenediamine, ethylenediamine, diethylenetriamine, etc., and vicinal epoxies such as reaction products of epichlorohydrin and Bisphenol-A including the diglycidyl ether of Bisphenol-A sold under the name DER332. In those cases where color is important, the polyepoxies are preferred since polyamines cause the composition to be off-white in color. The polyamines can also cause odor problems during manufacture.

The polyfunctional cross-linker should be present in a concentration of 0.5 to 15 parts by weight cross-linker per 100 parts by weight of the resinous components. The preferred range of cross-linker is 2 to 8 parts by weight cross-linker per 100 parts by weight resinous components. The concentration of cross-linker is dependent upon such things as the molecular weight of the desired product and the concentration of carboxyl groups in the modified propylene polymer.

The interaction of the various cross-linkers, polypropylene components, and fire retardants is not fully understood and sometimes yields anomalous results. For example, although p-phenylenediamine was found to be more effective than hexamethylenediamine in stopping drip in compositions containing only modified propylene polymer and cross-linker, it was less effective than hexamethylenediamine in stopping drip when flame retardants were added to the composition.

Any additive system which effectively prevents burning in polypropylene can be used in this invention. Such systems commonly comprise an inorganic component, such as antimony trioxide, and one or more halogenated organic components commonly containing chloride and/or bromine.

Although antimony trioxide is preferably used as a fire-retardant in polypropylene compositions, other inorganic or organic compounds containing a suitable inorganic component such as those containing boron, nitrogen, and phosphorus can be used. For example, U.S. Pat. 3,892,667 discloses the use of sodium antimonate particles with halogenated components. Various other fire retardants can be used such as those disclosed in "Modern Plastics", Vol. 5, No. 5, May 1975, pages 42 to 45, which is incorporated by reference.

Numerous halogenated organic components effective in polypropylene can be used in this invention together with antimony trioxide or other inorganic fire retardants. Suitable chlorinated and brominated components useful in this invention are substantially non-volatile at the melting point of the polypropylene composition. Typically these halogenated compounds have a molecular weight above 200, and contain 35–93% by weight halogen. These include chlorinated paraffins, substituted tribromoanilines, phenols or phenol ethers substituted on the benzene nucleus with bromine atoms, etc. Representative fire retardant systems include those disclosed in U.S. Pat. No. 3,419,518 which discloses the use of a brominated cycloalkane containing 45 to 93% by weight of bromine, such as hexabromocyclododecane, with antimony trioxide in polypropylene compositions; Dechlorane Plus, manufactured by Hooker Chemical Company, containing approximately 65.1% chlorine, and decabromodiphenyl oxide with antimony trioxide.

To meet UL-94V 1 specifications, fire retardants should comprise at least 0.5 parts by weight per 100 parts by weight of the total concentration of resinous propylene components and cross-linker. Preferably fire retardants comprise 15 to 30 parts by weight per 100 parts by weight of the total concentration of resinous propylene components and cross-linker. However, at a sacrifice of physical and chemical properties up to 50 parts by weight can be used. In the preferred system, the optimum additive ratio of antimony trioxide to halogen containing compound has been found to be about 1:1 to 2:1 parts by weight. However, the optimum ratio depends on the particular bromine and/or chlorine containing component selected.

The blending of the unmodified propylene polymer with the modified propylene polymer, cross-linking agent, and conventional fire retardants can be accomplished by means of any convenient procedure which results in an intimate admixture of the various components. For example, the modified and unmodified polypropylene can be dry blended with the conventional fire retardants. The cross-linker can then be dissolved or dispersed in a non-reactive liquid which does not dissolve the resinous components, such as methanol for polyamines, mixed with the dry blended stock, and dried. If there is a danger of reaction between the cross-linker and the liquid medium, such as between polyepoxides and methanol, the cross-linker can be dry-blended also.

The non-dripping polypropylene compositions of this invention can contain various optional additives such as plasticizers, lubricants and mold release agents, heat and light stabilizers, fiberglass reinforcing materials, pigments and other functional additives commonly used in polypropylene compositions.

The following examples are merely illustrative and should not be construed as limiting the scope of the invention.

EXAMPLE 1

A modified resinous polymer of propylene containing approximately 10% by weight methacrylic acid was prepared as follows: 0.5 grams of Lupersol 256 Peroxide (peroxyhexanoic acid manufactured by Wallace & Tiernan Inc., Lucidol Division) was added to a reactor containing 200 grams of substantially crystalline homopolymeric polypropylene powder, 25 grams of methacrylic acid and 600 grams of water. The mixture was then heated at just below reflux temperature, about 95° C, for one hour. The product was filtered and washed with water followed by acetone and then dried in a vacuum oven at 75° C for two hours. The modified resinous polymer of propylene weighed 225.6 grams.

Ninety-one parts by weight modified resinous polymer of propylene and 9 parts by weight conventional fire retardants, identified in Table I below, of the type routinely included in UL-94V 2 polypropylene resins to make them self-extinguishing were dry blended. Four parts by weight CYMEL 300 (hexamethoxymethylmelamine) cross-linker, dissolved in methanol was added to the blend, mixed and dried.

While an antimony-halogen system was used in this example, other systems can be used such as those using zinc borate or Dawsonite.

A UL-94 Burning Test was then conducted, except that the test was carried out in a vented hood. The above composition burned and dripped. The CYMEL 300 also caused the composition to be soggy.

EXAMPLE 2

Example 1 was repeated except that 4 parts by weight hexamethylenediamine was used as the cross-linker instead of CYMEL 300. The composition was non-dripping but was not self-extinguishing. The full composition results are set forth below in Table I.

EXAMPLE 3

Example 1 was repeated except that 4 parts by weight DER 332 was used as the cross-linker. In this case, the cross-linker was dry blended with the modified polypropylene and fire retardants to avoid possible reaction with the methanol. The composition was non-dripping but did not self-extinguish. The full composition results are set forth below in Table I.

EXAMPLE 4

Example 1 was repeated except that 4 parts by weight p-phenylenediamine was used as the crosslinker. The composition burned and dripped. The composition was purple in color.

The results of the Burning Tests are given in the following table:

Table I

| Runs | 1 | 2 | 3 | 4 |
|---|---|---|---|---|
| Composition (all amounts are parts by weight) | | | | |
| Polypropylene-methacrylic graft | 91 | 91 | 91 | 91 |
| Antimony trioxide | 3 | 3 | 3 | 3 |
| Hexabromocyclododecane | 4 | 4 | 4 | 4 |
| Chlorowax 70-S* | 2 | 2 | 2 | 2 |
| Cross-linker added | | | | |
| CYMEL 300* | 4 | — | — | — |
| Hexamethylenediamine | — | 4 | — | — |
| DER 332* | — | — | 4 | — |
| p-phenylenediamine | — | — | — | 4 |
| UL-94 Test (conducted in vented hood) | | | | |
| Burning | yes | yes | yes | yes |
| Dripping | yes | no | no | yes |

*Chlorowax 70-S is a chlorinated paraffin sold by Diamond Shamrock Chemical Co. containing approximately 69% chlorine; having a ball and ring softening point of 102° C; and a specific gravity of 1.63.
CYMEL 300 is hexamethoxymethylmelamine.
DER 332 is the diglycidyl ether of Bisphenol-A.

As shown in the table, compositions 2 and 3 containing hexamethylenediamine and DER 332 cross-linkers respectively were made non-dripping without increasing significantly the level of fire retardants present. The CYMEL 300 and p-phenylenediamine cross-linkers present in compositions 1 and 4 respectively were not sufficiently reactive with the carboxyl groups of the modified polypropylene to cross-link the composition to a non-dripping mass.

EXAMPLE 5

Example 3 was repeated with substantially the same results except that the level of fire retardants was increased from 9.0 to 12.6 parts by weight. The composition was non-dripping but failed to self-extinguish. The full composition results are set forth below in Table II.

EXAMPLE 6

Example 2 was repeated with the level of fire retardants increased from 9.0 to 12.6 parts by weight. The composition was non-dripping but failed to self-extinguish. The results are set forth below in Table II.

EXAMPLE 7

Example 3 was repeated with the level of fire retardants increased from 9.0 to 30.0 parts by weight. The composition was non-dripping and self-extinguishing. The results are summarized in the following table:

TABLE II

| Runs | 5 | 6 | 7 |
|---|---|---|---|
| Composition (all amounts are parts by weight) | | | |
| Polypropylene-methacrylic acid graft | 87.4 | 87.4 | 70 |
| Antimony trioxide | 2.8 | 2.8 | 10 |
| Hexabromocyclododecane | 5.6 | 5.6 | 13 |
| Chlorowax 70-S | 4.2 | 4.2 | 6.6 |
| Cross-linker | | | |
| Hexamethylenediamine | — | 4 | — |
| DER 332 | 4 | — | 4 |
| UL-94 Tests (conducted in vented hood) | | | |
| Burning | yes | yes | no |
| Dripping | no | no | no |

As shown above, the level of fire retardants necessary to make the non-dripping compositions containing only modified polypropylene self-extinguishing was between 12.6 and 30.0 parts by weight.

EXAMPLE 8

A polypropylene composition was prepared by DRY blending unmodified substantially crystalline homopolymeric polypropylene, modified polypropylene containing approximately 12.0% methacrylic acid (prepared as previously described), polyfunctional cross-linker, and approximately 15 parts by weight fire retardants. The compositions employed and results of the Burning Tests are given below:

| Run | 8 |
|---|---|
| Composition (all amounts are parts by weight) | |
| Unmodified polypropylene | 50 |
| Modified polypropylene (12% methacrylic acid by weight) | 35 |
| Antimony trioxide | 5 |
| Hexabromocyclododecane | 6.7 |
| Chlorowax 70-S | 3.3 |
| Cross-linker | |
| DER 332 diepoxide | 4 |
| UL-94 Test (conducted in vented hood) | |
| Burning | no |
| Dripping | no |

The above data indicates that a non-dripping, fire retardant polypropylene composition can be produced without increasing significantly the level of fire retardants in the composition. The polypropylene/modified polypropylene compositions of this invention containing only about 15% by weight fire retardants have the same level of fire retardancy as an unmodified polypropylene composition containing approximately 40% by weight fire retardants.

EXAMPLE 9

The polypropylene composition of Example 8 containing 50 parts by weight unmodified polypropylene was made self-extinguishing with a lower level of fire retardants than the composition of Example 7 containing only modified polypropylene. Another blend was prepared similar to that of Example 8 but containing only modified polypropylene. The same cross-linker was used and the same level of fire retardants were present. The composition employed and test results are given below:

| Run | 9 |
|---|---|
| Composition (all amounts are parts by weight) | |
| Unmodified polypropylene | 0 |
| Modified polypropylene (12% methacrylic acid by weight) | 85 |
| Antimony trioxide | 5 |
| Hexabromocyclododecane | 6.7 |
| Chlorowax 70-S | 3.3 |
| Cross-linker | |
| DER 332 diepoxide | 4 |
| UL-94 Test (with vented hood) | |
| Burning | yes |
| Dripping | no |

Although the results are not fully understood, the data, as shown above, indicates that less fire retardants are required where mixtures of modified polypropylene and unmodified polypropylene are used rather than when compositions comprising all or substantially all modified polymer are employed. In any case, it is desirable to use mixtures of modified polypropylene and unmodified polypropylene since such mixtures are more economical and are closer in physical and chemical properties to the base polymer.

What is claimed is:

1. A composition comprising;
 a. a resinous polymer of propylene comprising an alpha, beta-ethylenically unsaturated carboxylic acid modified resinous polymer of propylene; and
 b. polyfunctional cross-linker containing vicinal polyepoxides wherein said polyfunctional cross-linker is present in a concentration of 0.5 to 15 parts by weight cross-linker per 100 parts by weight resinous polymer of propylene.

2. The composition of claim 1, wherein a fire retardant is present in a concentration of 0.5 to 50 parts by weight per 100 parts by weight of the total concentration of resinous polymer of propylene and polyfunctional cross-linker.

3. The composition of claim 1, wherein said resinous polymer of propylene comprises an unmodified resinous polymer of propylene in a concentration of 0.5 to 3 parts by weight per each part by weight modified resinous polymer of propylene.

4. The composition of claim 2, wherein said resinous polymer of propylene comprises an unmodified resinous polymer of propylene in a concentration of 0.5 to 3 parts by weight per each part by weight modified resinous polymer of propylene.

5. The composition of claim 4, wherein said unmodified resinous polymer of propylene comprises at least 75% by weight propylene.

6. The composition of claim 4, wherein said modified resinous polymer of propylene comprises a backbone polymer containing at least 75% by weight propylene and the pendant acid moieties provided by alpha, beta-ethylenically unsaturated carboxylic acid in said polymer comprise from 0.5 to 25% by weight of said polymer.

7. The composition of claim 6, wherein said fire retardant comprises an antimony compound and a halogenated organic compound.

8. The composition of claim 6, wherein said alpha, beta-ethylenically unsaturated carboxylic acid moieties are methacrylic acid.

9. The composition of claim 8, wherein said polyfunctional cross-linker is the digylcidyl ether of Bisphenol-A.

* * * * *